(12) United States Patent
Odoi et al.

(10) Patent No.: US 6,181,399 B1
(45) Date of Patent: Jan. 30, 2001

(54) REFLECTIVE TYPE LIQUID CRYSTAL DISPLAY HAVING SCATTERING POLARIZER

(75) Inventors: Yuzo Odoi; Akira Tsumura; Kyoichiro Oda; Fumio Matsukawa, all of Hyogo (JP)

(73) Assignee: Mitsubishi Denki Kabushiki Kaisha, Tokyo (JP)

(*) Notice: Under 35 U.S.C. 154(b), the term of this patent shall be extended for 0 days.

(21) Appl. No.: 09/236,642

(22) Filed: Jan. 26, 1999

(30) Foreign Application Priority Data

Sep. 1, 1998 (JP) .................................................. 10-247236

(51) Int. Cl.⁷ .................................................. G02F 1/1335
(52) U.S. Cl. .............................................. 349/113; 349/96
(58) Field of Search ........................................ 349/113, 96

(56) References Cited

U.S. PATENT DOCUMENTS 5,995,183 * 11/1999 Tsuyoshi .............................. 349/112
5,999,239 * 12/1999 Larson .................................. 349/96

FOREIGN PATENT DOCUMENTS 8-76114  * 3/1996 (JP) .
10-3078  * 1/1998 (JP) .

OTHER PUBLICATIONS

"Classification of Reflective Type LCDs and Use Efficiency of Light", T. Uchida et al., Gekkan LCD Intelligence, Apr. 1997, pp. 54–58.*

* cited by examiner

Primary Examiner—James A. Dudek
(74) Attorney, Agent, or Firm—McDermott, Will & Emery

(57) ABSTRACT

A reflective type liquid crystal display, which permits brighter display than conventional devices, can be used in a dark place and has a simple structure, is provided. The reflective type liquid crystal display includes a polarizer provided in the front of liquid crystal, and a backside-scattering-polarizer provided in the backside of the liquid crystal to transmit a polarized light component in one direction and reflect with scattering a polarized light component orthogonal to that one direction opposite to the advancing direction of the light.

8 Claims, 5 Drawing Sheets

FIG. 6
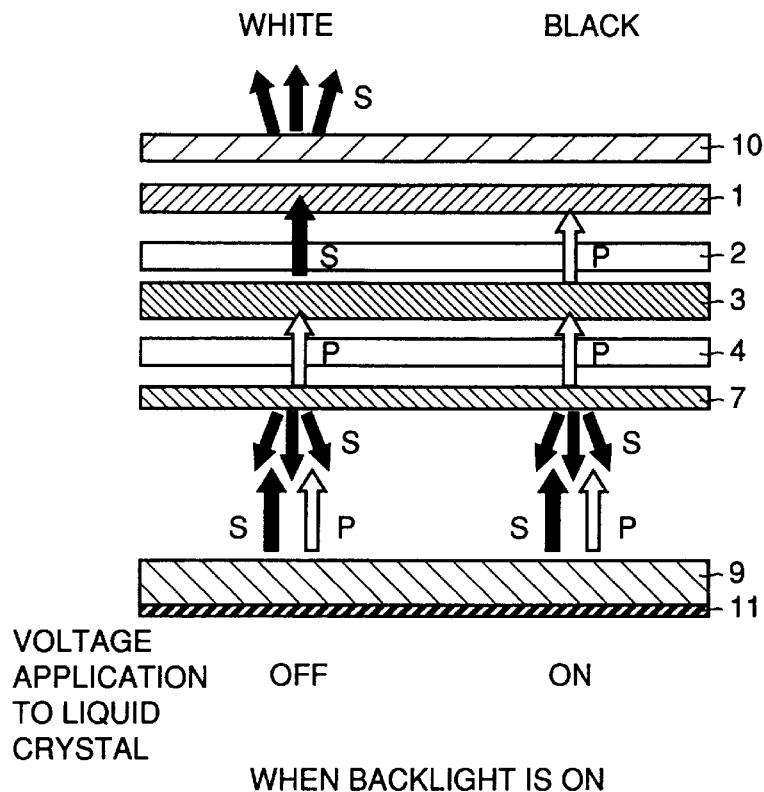
VOLTAGE
APPLICATION   OFF          ON
TO LIQUID
CRYSTAL
WHEN BACKLIGHT IS ON
FIG. 7  PRIOR ART   ⇒ P POLARIZED LIGHT
                    ➡ S POLARIZED LIGHT
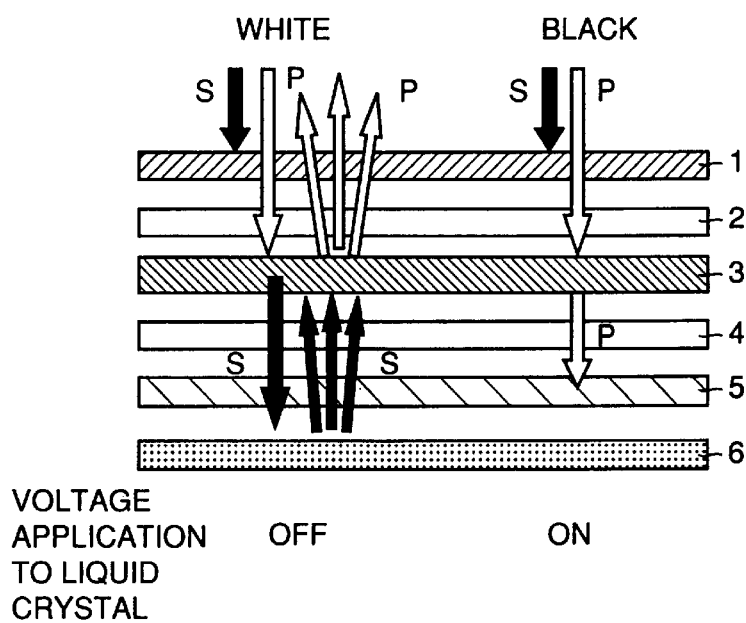
VOLTAGE
APPLICATION   OFF          ON
TO LIQUID
CRYSTAL

REFLECTIVE TYPE LIQUID CRYSTAL DISPLAY HAVING SCATTERING POLARIZER

BACKGROUND OF THE INVENTION

1. Field of the Invention

The present invention relates generally to liquid crystal displays used for displaying information in mobile phones, mobile terminals, and various electric home appliances.

2. Description of the Background Art

Liquid crystal does not emit light itself and controls externally applied light transmitted therethrough for display. Methods of allowing external light to be transmitted through the liquid crystal are divided into two kinds. One is a direct vision or transmissive type, according to which a backlight is provided in the backside of the liquid crystal seen from the viewer and light emitted from the backlight is transmitted through the liquid crystal. The other is a reflective type, according to which light coming in from the front of the liquid crystal is reflected upon a reflecting board provided in the backside of the liquid crystal, and the reflected light is transmitted through the liquid crystal. The reflective type liquid crystal display which does not require a backlight has been vigorously developed, because this type of displays are power saving, thin and lightweight. In addition, since members for the backlight are not necessary, the cost may be reduced.

There have been proposed reflective type liquid crystal displays of various constructions (see, for example, Gekkan LCD Intelligence, April, 1997, pp. 54–58 showing reflective type liquid crystal displays of various constructions). In the reflective type liquid crystal display, light transmitted through a liquid crystal portion should have a scattering property in order to allow sufficient light to reach the viewer from every position of the liquid crystal picture plane. Therefore, the reflective type liquid crystal display has a member to provide the scattering property to the light reaching the viewer. In view of the positions of optical members to provide the scattering property, the constructions of devices may be divided into the following three kinds: (1) the scattering property is provided in the backside of the liquid crystal seen from the viewer, (2) the scattering property is provided in the front of the liquid crystal, and (3) the scattering property is provided within the liquid crystal itself.

FIG. 7 is an illustration of an example of the reflective type liquid crystal display in the case of the above (1). In FIG. 7, the viewer is positioned in the upper part, in other words, in the front, and light comes in from the upper part. A polarizer 1 absorbs a polarized light component orthogonal to one direction (referred to as "S polarized light"), and transmits a polarized light component parallel to that one direction (referred to as "P polarized light"). Liquid crystal 3 is TN (Twisted Nematic) liquid crystal with the most general twist angle of 90°. Transparent substrates 2 and 4 composed of glass, plastic or the like are provided in the front and backside of liquid crystal 3, respectively. A polarizer 5 has an absorbing axis orthogonal to that of polarizer 1 (in the cross Nicol relation). Provided in the backside of polarizer 5 is a reflecting board 6 having a surface of scattering type white resin or a metallic surface with a high reflectance such as silver and aluminum treated to have a scattering property Polarizer 1 absorbs the S polarized light in the incident light and transmits the P polarized light. When a voltage is not applied to liquid crystal 3, the P polarized light transmitted through TN liquid crystal 3 with the twist angle of 90° is converted into S polarized light, which is then transmitted through polarizer 5. The S polarized light scattered upon reflecting board 6 is once again changed into P polarized light, which is then transmitted through polarized light 1 to reach the viewer, and therefore white display is made.

At this time, color display is also enabled instead of the white display. If a color filter is inserted between the viewer and the reflecting board, color display is enabled. If the reflecting board selectively reflects a particular wavelength, color display is enabled.

When a voltage is applied to liquid crystal 3, the twist of 90° of liquid crystal 3 is untwined, and therefore the incident P polarized light is transmitted as is through liquid crystal 3, and absorbed by polarizer 5. The light is not reflected to reach the viewer and black display is made as a result.

Note that assuming that the absorbing axes of polarizer 1 and 5 are parallel to each other rather than orthogonal, black display is made when a voltage is not applied to the liquid crystal, and white display is made when a voltage is applied. A color operation mode is also permitted.

In the above example, light is transmitted through a polarizer four times altogether before reaching the viewer. An ideal polarizer would not absorb light, but in practice about several to 10% light is absorbed and therefore the number of transmission of light through the polarizer is preferably as small as possible in order to provide bright display.

In order to solve this disadvantage, another type of reflective liquid crystal displays has been recently proposed (see, for example, Japanese Patent Laying-Open No. 10-3078). FIG. 8 shows this proposed reflective type liquid crystal display. This display device is characterized by the use of a polarized-light-separating-plate (reflective type polarizer) 71 which transmits a polarized light component P parallel to one direction in incident light and reflects a polarized light component S orthogonal to that one direction. A scattering (diffusion) plate 61 is provided in the front of polarized-light-separating-plate 71, and a light absorbing plate 8 is provided in the backside. Polarizer 1 absorbs S polarized light and transmits P polarized light.

When a voltage is not applied to liquid crystal 3, the P polarized light transmitted through liquid crystal 3 with the twist of 90° is converted into S polarized light. Subsequently, the S polarized light is scattered by scattering plate 61 and reflected by polarized-light-separating-plate 71. The S polarized light once again scattered by scattering plate 61 is again converted into P polarized light, which is transmitted through polarizer 1 to reach the viewer and therefore white display is made.

When a voltage is applied to liquid crystal 3, the twist of 90° is untwined, P polarized light incident to liquid crystal 3 is transmitted through liquid crystal 3 as is, scattered by scattering plate 61, transmitted through polarized-light-separating-plate 71 and absorbed by light absorbing plate 8. The light which is not reflected and hence not emitted toward the front does not reach the viewer and therefore black display is made.

In the conventional example shown in FIG. 8, since one of the polarizer is not necessary with polarized-light-separating-plate 71 functioning both as a reflecting board and a polarizer, brighter display is made accordingly.

When the reflective type liquid crystal display shown in FIG. 8 is used, scattering plate 61 and polarized-light-separating-plate 71 should be combined in order to provide necessary scattering property. In this case, a part of light is scattered to the backside irrespectively of polarization when a normal scattering plate is used, and therefore the contrast is lowered. Incident light transmitted through scattering plate 61 will not be vertical to polarized-light-separating-plate 71, the polarized light separation performance by polarized-light-separating-plate 71 for separating the S polarized light and P polarized light could be lowered in some cases.

Furthermore, as described above, the conventional reflective type liquid crystal display cannot be used in a dark place where there is no incident light. In order to solve this disadvantage, a half mirror is used for the reflecting board, or an opening is provided at a part of the reflecting board to transmit a part of light, such that the device may be used also as a transmissive type display with a backlight provided in the backside. The reflecting board of this construction is however poor in performance, and the picture plane could be disadvantageously dark.

SUMMARY OF THE INVENTION

It is one object of the present invention to provide a reflective type liquid crystal display of a simple structure, which permits brighter display than conventional devices.

Another object of the invention is to provide a reflective type liquid crystal display of a simple structure, which can be used in a dark place.

A reflective type liquid crystal display according to one aspect of the present invention has a construction as follows. In the display, light incident from the front side of the liquid crystal is reflected in the backside of the liquid crystal, the reflected light is transmitted through the liquid crystal from the backside and the display of the liquid crystal portion is viewed from the front. The display includes a polarizer provided in the front of the liquid crystal, and a backside-scattering-polarizer provided in the backside of the liquid crystal to transmit a polarized light component in one direction of light and reflects with scattering a polarized light component orthogonal to that one direction opposite to the advancing direction of the light.

According to this aspect, a reflective type liquid crystal display of a simple structure which achieves brighter display than conventional displays may be provided.

The reflective type liquid crystal display according to this aspect often further includes a light absorbing body provided in the backside of the backside-scattering-polarizer.

Thus, light is not emitted to the front such that the state of black is further enhanced into completeness, the contrast may be enhanced, and high display quality may be secured.

When a reflective type liquid crystal display is used in a dark place where the incidence of light from the front is not expected, a backlight is provided. More specifically, in a reflective type liquid crystal display according to another aspect of the present invention, light incident from the front side of the liquid crystal is reflected in the backside of the liquid crystal, the reflected light is transmitted through the liquid crystal from the backside and the display of the liquid crystal portion is viewed from the front. The display includes a polarizer provided in the front of the liquid crystal, a backside-scattering-polarizer provided in the backside of the liquid crystal to transmit a polarized light component in one direction of the light and reflects with scattering a polarized light component orthogonal to that one direction opposite to the advancing direction of the light, and a backlight provided in the backside of the backside-scattering-polarizer and switchable between on and off states.

In this construction, a reflective type liquid crystal display of a simple constitution which achieves brighter display than conventional displays and allows the use of the backlight in a dark place may be provided. In addition, the backlight may be also used to provide brighter display other than in a dark place.

In the reflective type liquid crystal display according to another aspect of the invention, light incident from the front of liquid crystal is reflected in the backside of the liquid crystal, the reflected light is transmitted through the liquid crystal from the backside, and the display of the liquid crystal portion is viewed from the front. The display includes a polarizer and a front-scattering-polarizer provided in the front of the liquid crystal to transmit a polarized light component in one direction of light and transmit with scattering a polarized light component orthogonal to that one direction in the advancing direction of the light, and a reflecting board provided in the backside of the liquid crystal.

Thus, incident light comes back and forth to be scattered twice by the front-scattering-polarizer, which increases the effect of scattering and contributes to higher display quality.

In a reflective type liquid crystal display according to another aspect of the present invention including a backlight, light incident from the front of liquid crystal is reflected in the backside of the liquid crystal, the reflected light is transmitted through the liquid crystal from the backside, and the display of the liquid crystal portion is viewed from the front. The display includes a polarizer and a front-scattering-polarizer provided in the front of the liquid crystal to transmit a polarized light component in one direction of light and transmit with scattering a polarized light component orthogonal to that one direction in the advancing direction of the light, a backside-scattering-polarizer provided in the backside of the liquid crystal to transmit a polarized light component in one direction of light and reflect with scattering a polarized light component orthogonal to that one direction in the opposite direction to the advancing direction of the light, and a backlight provided in the backside of the backside-scattering-polarizer and switchable between on and off states.

Thus, the display may be used as a reflective type liquid crystal display as originally intended when the backlight is off, and brighter display is enabled because the number of transmission of white display making light through the polarizer is reduced at this time. Furthermore, since this light is scattered twice, i.e., through the front and backside-scattering-polarizer, a high scattering property results, which permits high quality picture display. Not only in a dark place, but also in other places, the backlight may be turned on in use when even brighter display is desired.

In the reflective type liquid crystal display including the backlight as described above, further provided is a reflecting member for reflecting the light reflected with scattering by the backside-scattering-polarizer in light emitted from the backlight when the backlight is on, and directing the light including the polarized light component in that one direction, which is allowed to be transmitted through the backside-scattering-polarizer.

As a result, the light may be more efficiently used and even brighter display is permitted.

As described above, the light coming from the liquid crystal portion to reach the viewer should have a scattering property, the transmission of a polarized light component in one direction in the backside-scattering-polarizer desirably includes small scattering.

Since the backside-scattering-polalizer has such a property, good visual perceptivity may be secured without using a scattering (diffusion) plate at the backlight side, when the liquid crystal display is formed essentially by the backside-scattering-polarizer, the polarizer and the backlight. If the front-scattering-polarizer is also used, an even greater scattering property results, which further improves the visual perceptivity accordingly.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing a reflective type liquid crystal display according to another embodiment of the present invention where backlight 9 is turned on;

FIG. 6 is a diagram showing the reflective type liquid crystal display shown in FIG. 5 where the backlight is turned on;

FIG. 7 is a diagram showing a conventional reflective type liquid crystal display.

DESCRIPTION OF THE PREFERRED EMBODIMENTS

Embodiments of the present invention will be now described in conjunction with the accompanying drawings. P polarized light (P) in each of the figures represents a polarized light component parallel to one direction, while S polarized light (S) represents a polarized light component orthogonal to that one direction. "BLACK" and "WHITE" in the figures in the upper parts represent white (bright) and black (dark), respectively in black and white display. The left half of each of the figures shows the voltage-off state where a voltage is not applied to liquid crystal, and the right half shows the voltage-on state where a voltage is applied to the liquid crystal.

First Embodiment

Figure 1:
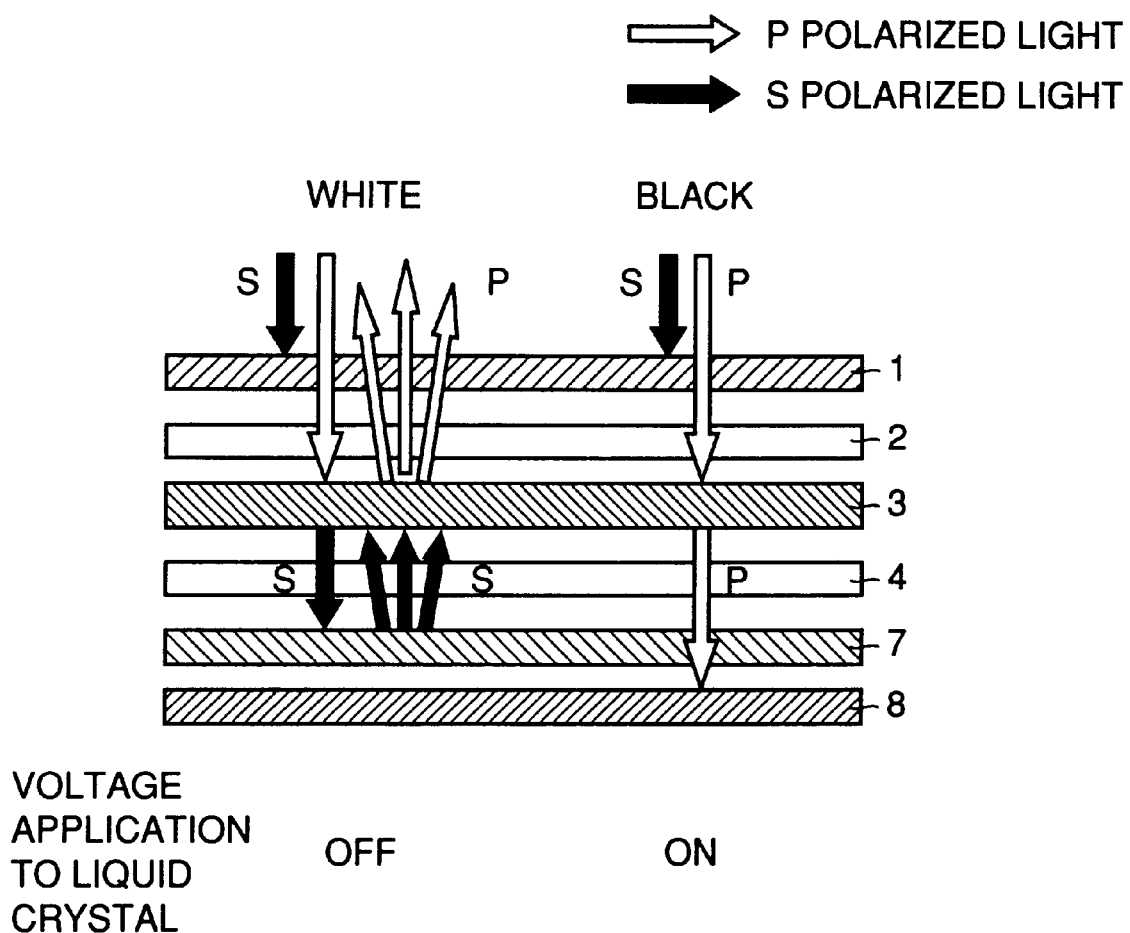
FIG. 1 is a diagram showing a reflective type liquid crystal display according to the present invention.

Referring to FIG. 1, the viewer is in the upper part, in other words in the front of the liquid crystal, and light comes in from the upper part. A polarizer 1 absorbs S polarized light in the incident light and transmits P polarized light. Liquid crystal 3 is general TN (Twisted Nematic) liquid crystal having a twist angle of 90°. A backside-scattering-polarizer 7 transmits the P polarized light transmitted through polarizer 1, and reflects with scattering the S polarized light orthogonal to the P polarized light to the backside.

The backside-scattering-polarizer may be any type which scatters the component radially opposite to the advancing direction (to the backside), and transmits straightforward or transmits while slightly scattering the other polarized light component to the backside (the slightly scattering state is not shown) rather than the type which simply reflects one of the two polarized light components. In terms of composition, backside-scattering-polarizer desirably includes a transparent material having a refractive index with anisotropy, a material different from a binder which is a main component, dispersed evenly in a polymer film. The backside-scattering-polarizer may be readily manufactured without a complicated process such as vapor deposition and a high level liquid crystal alignment technique. The material is relatively easily available and permits inexpensive manufacture. A backside-scattering-polarizer and a conventional polarizer may be integrally joined together and used as the backside-scattering-polarizer.

The P polarized light transmitted through polarizer 1 is converted into S polarized light during the transmission through liquid crystal 3 having a twist angle of 90°, when a voltage is not applied to liquid crystal 3. The S polarized light is reflected with scattering to the backside, in other word to the upper side by the succeeding backside-scattering-polarizer 7. The S polarized light reflected with scattering to the backside by backside-scattering-polarizer 7 is once again converted into P polarized light through liquid crystal 3 and transmitted through polarizer plate 1 to reach the viewer, and white display is made in a voltage-off state.

When a voltage is applied to liquid crystal 3, the twist of 90° is untwined, so that P polarized light incident to liquid crystal 3 is transmitted as is through liquid crystal 3, transmitted through backside-scattering-polarizer 7, and then absorbed by a light absorbing plate 8. Since the light does not reach the viewer, black display is made. At this time, a black and white operation mode is attained.

If color display is made, light absorbing plate 8 is adapted to absorb only light in a particular wavelength and to reflect with scattering light in the other wavelengths. As a result, the light not absorbed is reflected with scattering, and the P polarized light in the reflected wavelength range is once again transmitted through backside-scattering-polarizer 7, liquid crystal 3, and polarizer 1 to reach the viewer, who will observe light in a color corresponding to the reflected wavelength range. In this case, a color and white operation mode is attained.

In addition, a color filter may be inserted somewhere between the viewer and the backside-scattering-polarizer. In this case, a color and black operation mode is attained.

As described above, backside-scattering-polarizer 7 functions both as a polarizer and a reflecting board with a scattering property, a reflecting board is not necessary in black and white display. Furthermore, since the number of the transmission of light through the polarizer may be reduced, brighter display than conventional displays may be permitted.

In this case, if backside-scattering-polarizer 7 and light absorbing plate 8 are previously joined into a sheet form, the reflective type liquid crystal display may be more readily assembled.

Note that in order to eliminate parallax caused by the thickness of substrate 4 located between liquid crystal 3 and backside-scattering-polarizer 7 controlling light, substrate 4 is desirably formed as thin as possible. Backside-scattering-polarizer 7 is preferably formed into a thin film and positioned between transparent substrate 4 and liquid crystal 3 as a scattering reflecting layer.

In conventional reflective type liquid crystal displays, if a reflecting layer is positioned in the backside of liquid crystal, only a single polarizer can be positioned in the front, and therefore the liquid crystal cannot be used as is as TN liquid crystal with a twist angle of 90° and TN liquid crystal with a twist angle of 45° is used. However, according to the present invention, since the scattering reflecting layer also functions to separate polarized light, the TN liquid crystal with a twist angle of 90° may also be used.

Second Embodiment

Figure 2:
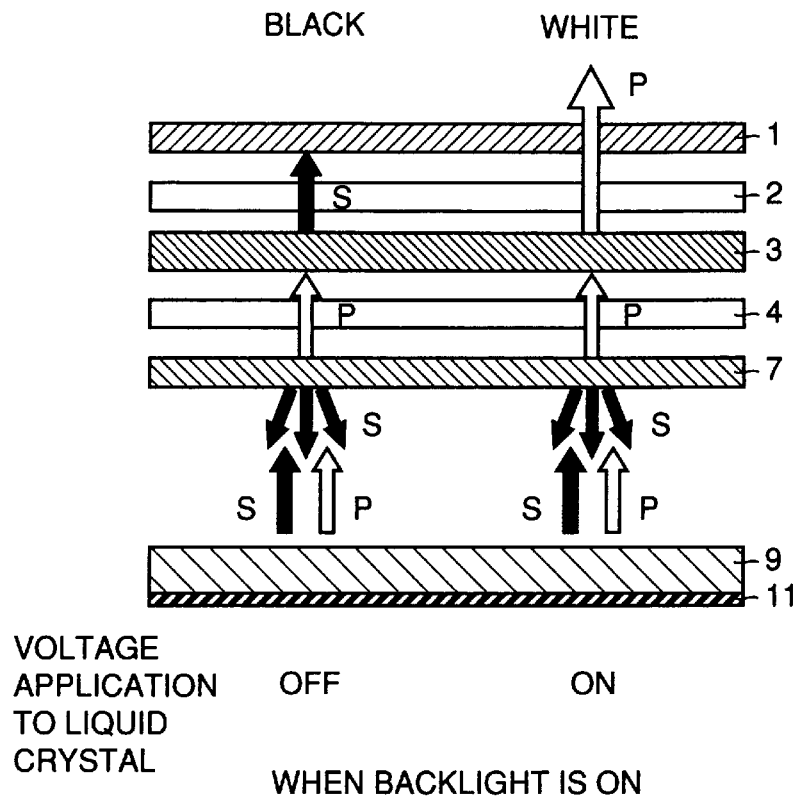

Referring to FIG. 2, in a second embodiment of the invention, when a backlight is not used, in other words, when the reflective type liquid crystal display is used as originally intended, light transmitted through backside-scattering-polarizer 7 and coming into backlight 9 is prevented from being reflected at a reflecting member 11 and returning. At this time, backlight 9 including reflecting member 11 functions similarly to the light absorbing plate, so that the light does not reach the viewer, and black display is surely made. The other operation principles are the same as those in the first embodiment.

If the ambience around the viewer is dark and there is little light coming into the device, the device cannot be used as a reflective type liquid crystal display. However, since the backlight is provided in the second embodiment, the device may be used as a direct-vision type liquid crystal display. More specifically, in light emitted from backlight 9, backside-scattering-polarizer transmits P polarized light and scatters S polarized light to the backside and back to backlight 9. If this scattered light has its S polarized light partially cancelled by reflection with scattering in backlight 9, reflected by reflecting member 11, and emitted again while including the P polarized light, the light may be used more efficiently, because P polarized light contributes to white display making.

In this case, the P polarized light is transmitted through scattering polarizer 7 as advancing straightforward, but transmitted while slightly being scattered (the slightly scattered state is not shown.) Thus, the scattering (diffusion) plate on the backlight side may be omitted. By providing the slight scattering, the light can reach the viewer from every position of the liquid crystal picture plane, and high visual perceptivity results.

When a voltage is not applied to the liquid crystal, P polarized light incident to the liquid crystal is converted to S polarized light by liquid crystal 3. The S polarized light is absorbed by polarizer 1 and will not reach the eyes of the viewer, so black display is made.

When a voltage is applied to the liquid crystal, the twist of the liquid crystal is untwined, and therefore P polarized light incident to the liquid crystal is transmitted therethrough as is. The P polarized light is transmitted through polarizer 1 to reach the eyes of the viewer, and white display is made.

Note that black and white in display in a backlight-on state and a backlight-off state are reversed between a transmissive type liquid crystal display and a reflective type liquid crystal display, and therefore a signal representing an on/off state for voltage application is inverted.

Third Embodiment

Figure 3:
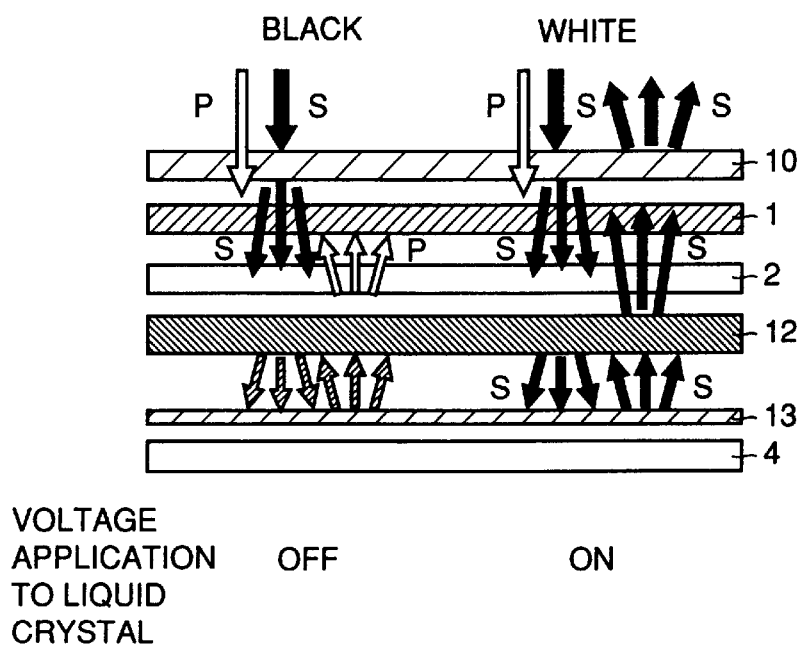
FIG. 3 is a diagram showing a reflective type liquid crystal display according to another embodiment of the invention.
Figure 4:
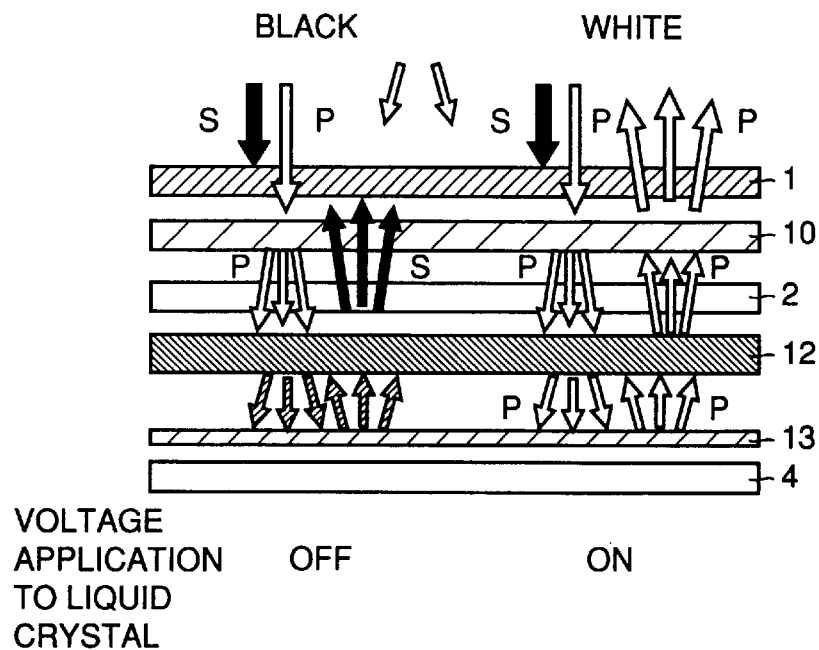
FIG. 4 is a diagram showing a reflective type liquid crystal display according to another embodiment of the invention.

Referring to FIG. 3, a front-scattering-polarizer 10 transmits a polarized light component in one direction of incident light and transmits with scattering a polarized light component orthogonal to that one direction toward the front. Liquid crystal 12 is TN liquid crystal with a twist angle of 45°, and a reflecting layer 13 is provided closer to the side of the liquid crystal than a transparent substrate 4 and composed of a metal such as aluminum and silver. The reflecting layer does not have to have a scattering property. In the third embodiment, front-scattering-polarizer 10 transmits P polarized light and transmits with scattering S polarized light to front. Polarizer 1 absorbs the P polarized light transmitted through front-scattering-polarizer 10 and transmits the scattered S polarized light.

When a voltage is not applied to the liquid crystal, S polarized light incident to the liquid crystal becomes elliptically polarized light by the 45° TN liquid crystal 12, is reflected upon reflecting layer 13, once again transmitted through 4520 TN liquid crystal 12 and converted into P polarized light. Since the P polarized light is absorbed by polarizer 1 and does not reach the eyes of the viewer, black display is made.

When a voltage is applied to the liquid crystal, the twist of the liquid crystal is untwined, and therefore S polarized light incident to the liquid crystal is reflected by reflecting layer 13, and let out as S polarized light. The S polarized light is transmitted through polarizer 1 and once again scattered to the front by front-scattering-polarizer 10 to reach the eyes of the viewer, and white display is made. As the incident light comes back and forth, the light is scattered twice by front-scattering-polarizer 10, therefore the scattering effect increases, which improves visual perceptibility, and high quality picture display may be achieved.

Fourth Embodiment

In a fourth embodiment, front-scattering-polarizer 10 and polarizer 1 according to the third embodiment shown in FIG. 3 are replaced in their positions, and the other construction is the same excluding that transmitting and scattering component through polarizer 1. S polarized light is absorbed by polarizer 1, and P polarized light is transmitted through polarizer 1 and scattered to the front by front-scattering-polarizer 10. When a voltage is not applied to the liquid crystal, the P polarized light incident to the liquid crystal becomes elliptically polarized light by 45° TN liquid crystal 12, reflected by a reflecting layer 13, and converted into S polarized light once again through 45° TN liquid crystal 12. The S polarized light is once again scattered to the front by front-scattering-polarizer 10 but absorbed by polarizer 1 and does not reach the eyes of the viewer, so that black display is made.

When a voltage is applied to the liquid crystal, the twist of the liquid crystal is untwined, and therefore P polarized light incident to the liquid crystal is transmitted as is, reflected by reflecting layer 13, and comes into the liquid crystal to be let out as the P polarized light. The P polarized light is once again scattered to the front by front-scattering-polarizer 10 to reach the eyes of the viewer, and therefore white display is made. Also at this time, the light is scattered twice by front-scattering-polarizer 10 as the light comes back and forth, which increases the scattering effect so that visual perceptibility improves and high picture quality display may be achieved.

In the third and fourth embodiments described above, front-scattering-polarizer 10 and polarizer 1 may be previously joined into a sheet shape, so that the reflective type liquid crystal display may be more readily assembled.

Fifth Embodiment

Figure 5:
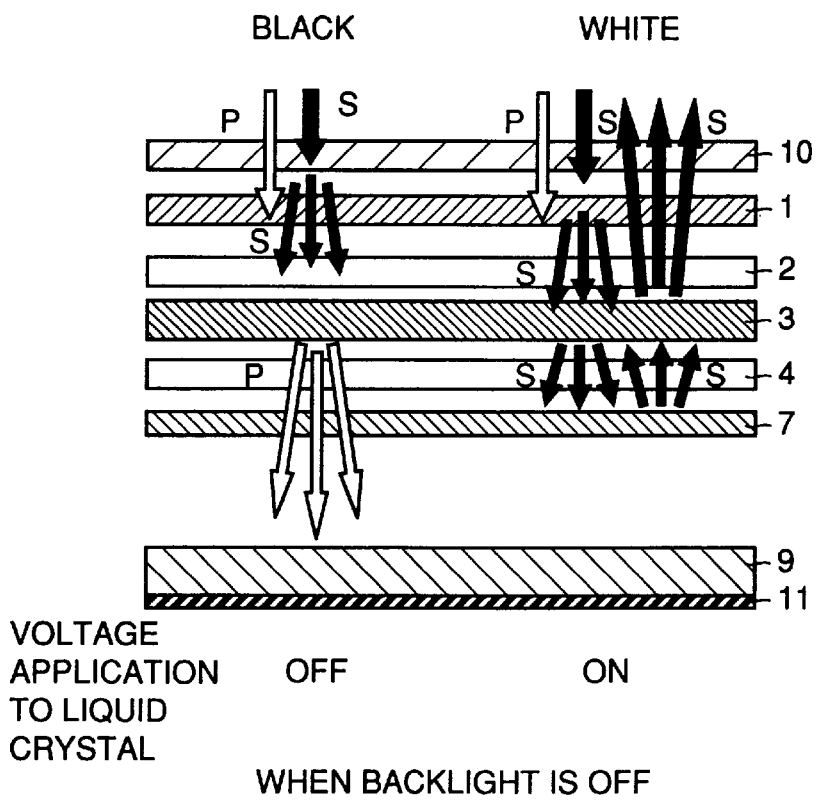
FIG. 5 is a diagram showing a reflective type liquid crystal display according to another embodiment of the invention where the backlight is turned off.
Figure 8:
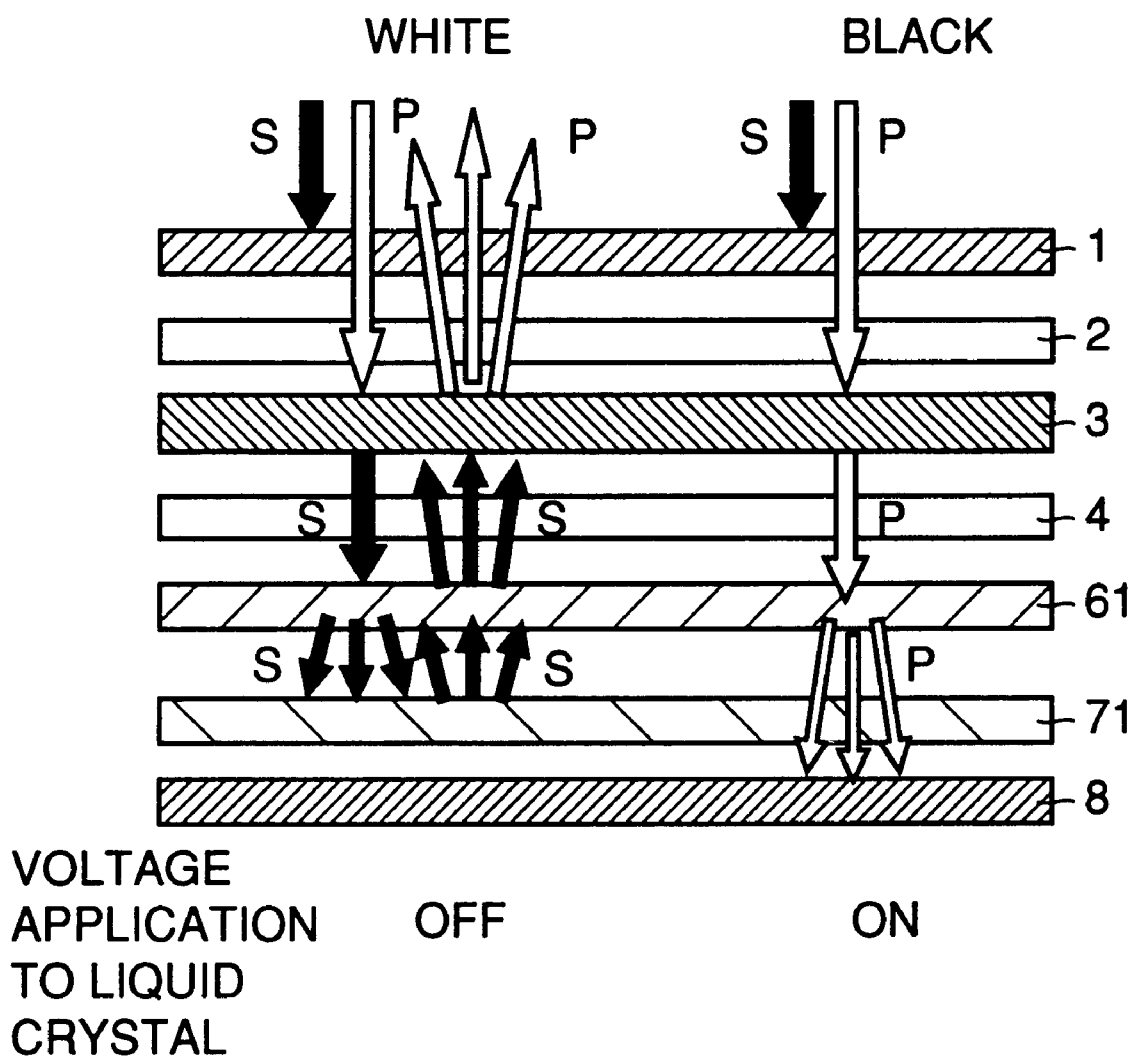
FIG. 8 is a diagram showing another conventional reflective type liquid crystal display.

Referring to FIG. 5, a front-scattering-polarizer 10 transmits P polarized light and scatters S polarized light to the front, while a backside-scattering-polarizer 7 transmits P polarized light and scatters S polarized light to the backside.

Operations when a backlight 9 is off, in other word, when the reflective type liquid crystal display is used as originally intended will be now described. Polarizer 1 absorbs the P polarized light which has been transmitted through front-scattering-polarizer 10 and transmits the S polarized light which has been scattered to the front as the scattered light. When a voltage is not applied to liquid crystal 3, TN liquid crystal with a twist angle of 90°, S polarized light incident to liquid crystal 3 is converted into P polarized light, which is transmitted through backside-scattering-polarizer 7 and comes into backlight 9. The P polarized light thus incident to backlight 9 will not reach the eyes of the viewer and black display is made if the P polarized light is prevented from being reflected by a reflecting member 11 and coming in.

When a voltage is applied to liquid crystal 3, the twist of liquid crystal 3 is untwined and S polarized light incident to liquid crystal 3 is transmitted as the S polarized light. The S polarized light is scattered by backside-scattering-polarizer 7 to the backside. The S polarized light is transmitted through polarizer 1 and once again scattered to the front by front-scattering-polarizer 10 to reach the eyes of the viewer and white display is made.

Operations when backlight 9 is turned on in a dark ambience for the viewer, in other words, when the display is used as a direct-vision type liquid crystal display will be now described in conjunction with FIG. 6. In light emitted from backlight 9, backside-scattering-polarizer 7 transmits P polarized light and scatters S polarized light to the backside and back to backlight 9. The scattered light is passed through backlight 9, has its polarized state partially changed as it is reflected by reflecting member 11 and becomes light including a P polarized light component. Thus, if the light is re-emitted as including both S and P polarized light components, the light may be more efficiently used.

When a voltage is not applied to the liquid crystal, P polarized light incident to 90° TN liquid crystal 3 is converted into S polarized light, which is transmitted through polarizer 1, and scattered to the front by front-scattering-polarizer 10 to reach the eyes of the viewer and white display is made. When a voltage is applied to liquid crystal 3, P polarized light incident to liquid crystal 3 is transmitted as is, absorbed by polarizer 1 and will not reach the eyes of the viewer and black display is made.

Note that since black and white in display are reversed between the direct-vision type and reflective type liquid crystal displays corresponding to voltage-on and -off states, a signal representing a voltage on/off state for voltage application to the liquid crystal is inverted when backlight 9 is used.

Note that in the above-described embodiments, the 90° and 45° TN types of liquid crystal are used. However, the above effects apply to other types of liquid crystal including STN (Super Twisted Nematic), horizontal electric field or IPS (In-Plane Switching), and VA (Vertical Arrangement) types. Any method of driving liquid crystal may be employed including a 2-terminal element type such as a segment type, a simple matrix type and MIM (Metal Insulator Metal) and a 3-terminal element type such as TFT (Thin Film Transistor).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reflective type liquid crystal display allowing light incoming from the front of a liquid crystal to be reflected in the backside of the liquid crystal panel, the reflected light to be transmitted through the liquid crystal from the backside and the display of the liquid crystal portion be viewed from the front, comprising:
   a first substrate positioned in front of the liquid crystal and a second substrate positioned in the backside of the liquid crystal, said first and second substrates supporting said liquid crystal held therebetween;
   a polarizer provided in the front of said first substrate; and
   a backside-scattering-polarizer inserted between said liquid crystal and said second substrate to transmit a polarized light component in one direction of light and reflect with scattering a polarized light component orthogonal to said one direction opposite to the advancing direction of the light.

2. The reflective type liquid crystal display as recited in claim 1, comprising, a light absorber provided in the backside of said backside-scattering-polarizer.

3. The reflective type liquid crystal display as recited in claim 1, wherein
   said transmission of the polarized light component in said one direction through said backside-scattering-polarizer is accompanied with small scattering.

4. A reflective type liquid crystal display allowing light incoming from the front of a liquid crystal to be reflected in the backside of the liquid crystal panel, the reflected light to be transmitted through the liquid crystal from the backside and the display of the liquid crystal portion to be viewed from the front, comprising:
   a polarizer provided in the front of said liquid crystal;
   a backside-scattering-polarizer provided in the backside of said liquid crystal to transmit a polarized light component orthogonal to said one direction opposite to the advancing direction of the light; and
   a backlight provided in the backside of said backside-scattering-polarizer and switchable between on and off states, whereby on and off voltage signals are alternately applied to said liquid crystal in response to switching between the on and off states of said backlight, so that the reflective type liquid crystal display can be used as a transparent type liquid crystal display without changing the position of black and white cells being displayed.

5. The reflective type liquid crystal display as recited in claim 4, further comprising, a reflecting member for reflecting light reflected with scattering by said backside-scattering-polarizer in light emitted from said backlight when said backlight is on, and directing the reflected light including the polarized light component in said one direction to said backside-scattering-polarizer.

6. The reflective type liquid crystal display as recited in claim 4, wherein
   said transmission of the polarized light component in said one direction through said backside-scattering-polarizer is accompanied with small scattering.

7. A reflective type liquid crystal display allowing light incoming from the front of a liquid crystal to be reflected in the backside of the liquid crystal panel, the reflected light be transmitted through the liquid crystal from the backside and the display of the liquid crystal portion be viewed from the front, comprising:
   a first substrate positioned in front of the liquid crystal and a second substrate positioned in the backside of the liquid crystal, said first and second substrates supporting said liquid crystal held therebetween;

a front scattering polarizer provided in the front of said liquid crystal to transmit a polarized light component in one direction of light and transmits with scattering a polarized light component orthogonal to said one direction in the advancing direction of the light; and a reflecting board inserted between said liquid crystal and said second substrate.

8. The reflective type liquid crystal display according to claim 4, wherein:

said backlight hardly returns any incoming light to said backside-scattering-polarizer when said backlight is turned off.

\* \* \* \* \*